(12) United States Patent
Slocum et al.

(10) Patent No.: US 12,139,403 B1
(45) Date of Patent: Nov. 12, 2024

(54) STORING ACTIVATED ALUMINUM (71) Applicant: LTAG SYSTEMS LLC, Bow, NH (US)

(72) Inventors: Jonathan T. Slocum, Bow, NH (US); Alexander H. Slocum, Bow, NH (US)

(73) Assignee: LTAG SYSTEMS LLC, Bow, NH (US)

( * ) Notice: Subject to any disclaimer, the term of this patent is extended or adjusted under 35 U.S.C. 154(b) by 63 days.

(21) Appl. No.: 17/463,836

(22) Filed: Sep. 1, 2021

Related U.S. Application Data

(63) Continuation of application No. 17/115,437, filed on Dec. 8, 2020, now Pat. No. 11,111,141.
(Continued)

(51) Int. Cl.
*C01B 3/08* (2006.01)
*B01J 19/00* (2006.01)

(52) U.S. Cl.
CPC ............. *C01B 3/08* (2013.01); *B01J 19/0053* (2013.01)

(58) Field of Classification Search
CPC ... C01B 3/08; C01B 3/065; C01B 2203/0405; C01B 3/00; C01B 2203/066; C01B 32/174; C01B 32/194; C01B 2203/0465; C01B 3/10; C01B 3/06; C01B 32/05; C01B 32/156; C01B 32/168; C01B 32/20; C01B 32/205; C01B 2203/041; C01B 13/20; C01B 19/004; C01B 2203/1647; C01B 2203/1685; C01B 3/02; C01B 3/061; C01B 3/501; C01B 32/19; C01B 2203/1052; C01B 2203/1058; C01B 2203/107; C01B 3/042; C01B 3/503; C01B 32/152; C01B 13/0255; C01B 2203/0233; C01B 3/0021; C01B 3/0026; C01B 3/0084; C01B 3/04; C01B 3/22; C01B 3/32; C01B 3/326; C01B 3/342; C01B 3/40; C01B 3/505;
(Continued)

(56) References Cited

U.S. PATENT DOCUMENTS 2,384,720 A   9/1945 Babcock et al.
3,204,320 A   9/1965 Eckstein et al.
(Continued)

FOREIGN PATENT DOCUMENTS

CN   103608957 A   *   2/2014   ............... B01J 7/00
CN   109678109 A       4/2019
(Continued)

OTHER PUBLICATIONS

USPTO; U.S. Appl. No. 17/475,320, Notice of Allowance mailed Mar. 9, 2022; 24 pages.
(Continued)

*Primary Examiner* — Kaity V Chandler
(74) *Attorney, Agent, or Firm* — THE MARBURY LAW GROUP, PLLC (57) ABSTRACT

A system for hydrogen formation includes a container and at least one object. The container defines a reservoir and is flexible along the reservoir. The container forms a gas-tight seal between the reservoir and an atmosphere outside of the container. The at least one object includes aluminum in an activated form. The at least one object is disposed in an inert environment in the reservoir, and the activated form of the aluminum reactable to produce hydrogen in the reservoir upon exposure to water.

13 Claims, 7 Drawing Sheets

Related U.S. Application Data (60) Provisional application No. 62/945,201, filed on Dec. 8, 2019.

(58) Field of Classification Search
CPC .......... C01B 3/56; C01B 32/40; C01B 33/02; C01B 7/00; C01B 7/04; C01B 7/0743; C01B 7/075; B01J 19/0053
See application file for complete search history.

(56) References Cited

U.S. PATENT DOCUMENTS

| | | | |
|---|---|---|---|
| 3,225,508 A | 12/1965 | Simon | |
| 3,381,655 A | 5/1968 | Rozzelle | |
| 3,549,123 A | 12/1970 | Bell et al. | |
| 3,552,724 A | 1/1971 | Thomsen | |
| 3,993,595 A | 11/1976 | Merkl | |
| 4,134,491 A | 1/1979 | Turillon et al. | |
| 4,264,018 A | 4/1981 | Warren | |
| 4,358,291 A | 11/1982 | Cuomo et al. | |
| 4,586,456 A | 5/1986 | Forward | |
| 4,770,848 A | 9/1988 | Ghosh et al. | |
| 5,301,631 A | 4/1994 | Vining | |
| 5,620,652 A | 4/1997 | Tack et al. | |
| 5,707,499 A | 1/1998 | Joshi et al. | |
| 5,732,752 A | 3/1998 | Glessner et al. | |
| 6,386,137 B1 | 5/2002 | Richie | |
| 6,506,360 B1 | 1/2003 | Andersen et al. | |
| 6,638,493 B2 | 10/2003 | Andersen et al. | |
| 7,364,815 B2 | 4/2008 | Nakagawa et al. | |
| 7,503,277 B2 | 3/2009 | Boschma, Jr. et al. | |
| 7,803,349 B1 | 9/2010 | Muradov | |
| 8,418,435 B2 | 4/2013 | Hatoum | |
| 8,430,704 B2 | 4/2013 | Jeffrey | |
| 8,522,835 B2* | 9/2013 | McLean .................... F17C 5/06 141/69 |
| 8,974,765 B2 | 3/2015 | Boyle et al. | |
| 9,090,323 B1 | 7/2015 | Ratner | |
| 9,174,140 B2 | 11/2015 | Nelson et al. | |
| 9,346,532 B1 | 5/2016 | Ratner | |
| 9,511,844 B1 | 12/2016 | DeVaul | |
| 9,624,103 B1 | 4/2017 | Woodall et al. | |
| 9,853,360 B2 | 12/2017 | Sylvia et al. | |
| 10,113,534 B2 | 10/2018 | Sia | |
| 10,258,950 B2 | 4/2019 | Kmetich et al. | |
| 10,737,754 B1 | 8/2020 | Farley et al. | |
| 10,745,789 B2 | 8/2020 | Slocum | |
| 10,829,192 B1 | 11/2020 | Farley et al. | |
| 10,829,229 B2 | 11/2020 | MacCallum et al. | |
| 10,988,227 B2 | 4/2021 | MacCallum et al. | |
| 10,995,680 B2 | 5/2021 | Tanaka et al. | |
| 11,130,557 B1 | 9/2021 | Slocum et al. | |
| 11,141,671 B2 | 10/2021 | Harter et al. | |
| 11,148,840 B1 | 10/2021 | Slocum et al. | |
| 11,148,947 B1 | 10/2021 | Slocum et al. | |
| 11,203,430 B2 | 12/2021 | Heppe | |
| 11,312,466 B1 | 4/2022 | Slocum et al. | |
| 11,318,437 B1 | 5/2022 | Slocum et al. | |
| 11,661,339 B1 | 5/2023 | Mahar et al. | |
| 2002/0088178 A1 | 7/2002 | Davis | |
| 2003/0024323 A1 | 2/2003 | Wang et al. | |
| 2003/0062444 A1 | 4/2003 | Goodey | |
| 2003/0235724 A1* | 12/2003 | Ord .................... H01M 8/04208 423/648.1 |
| 2007/0217972 A1 | 9/2007 | Greenberg et al. | |
| 2008/0063597 A1 | 3/2008 | Woodall et al. | |
| 2008/0193806 A1 | 8/2008 | Kulakov | |
| 2009/0127137 A1* | 5/2009 | Golz .................... C01B 3/0005 141/82 |
| 2009/0208404 A1 | 8/2009 | Itoh | |
| 2010/0028255 A1 | 2/2010 | Hatoum | |
| 2010/0061923 A1 | 3/2010 | Reddy | |
| 2010/0068132 A1* | 3/2010 | Vencill .................... C01B 3/047 96/9 |
| 2010/0112396 A1 | 5/2010 | Goldstein | |
| 2012/0052001 A1 | 3/2012 | Woodall et al. | |
| 2012/0100443 A1 | 4/2012 | Braithwaite et al. | |
| 2012/0107228 A1 | 5/2012 | Ishida et al. | |
| 2012/0318660 A1 | 12/2012 | Cohly et al. | |
| 2013/0004865 A1* | 1/2013 | Stimits .................... C01B 3/065 422/240 |
| 2013/0028809 A1* | 1/2013 | Barton .................... B01J 7/00 422/187 |
| 2014/0050625 A1* | 2/2014 | Zheng .................... C01B 3/06 422/310 |
| 2014/0261132 A1 | 9/2014 | Zeren et al. | |
| 2015/0204486 A1 | 7/2015 | Hoffmann | |
| 2015/0258298 A1 | 9/2015 | Satoh et al. | |
| 2016/0355918 A1 | 12/2016 | Slocum | |
| 2017/0022078 A1 | 1/2017 | Fukuoka | |
| 2018/0237141 A1 | 8/2018 | Heppe | |
| 2019/0201642 A1* | 7/2019 | Takehara .................... A61K 33/00 |
| 2019/0341637 A1 | 11/2019 | Fine et al. | |
| 2020/0199727 A1 | 6/2020 | Slocum et al. | |
| 2020/0199728 A1 | 6/2020 | Slocum et al. | |
| 2021/0061488 A1 | 3/2021 | Smithers et al. | |
| 2021/0115547 A1 | 4/2021 | Slocum | |
| 2021/0237843 A1 | 8/2021 | Slocum et al. | |
| 2021/0276865 A1 | 9/2021 | Meroueh | |
| 2021/0276866 A1 | 9/2021 | Meroueh | |
| 2022/0074023 A1 | 3/2022 | Godart | |
| 2023/0002026 A1 | 1/2023 | Limpaecher et al. | |

FOREIGN PATENT DOCUMENTS

| | | |
|---|---|---|
| EP | 2980352 | 2/2016 |
| GB | 2356184 A | 5/2001 |
| WO | 2009034479 A2 | 3/2009 |
| WO | 2012110136 A1 | 8/2012 |
| WO | 2021034805 A1 | 2/2021 |
| WO | 2021119628 A1 | 6/2021 |

OTHER PUBLICATIONS

Godart, P.; "Design of an Aluminum-Powered Reverse Osmosis Desalination System for Disaster Relief"; Massachusetts Institute of Technology Jun. 2019; Dept. of Mechanical Engineering; May 22, 2019; 105 pages.

Godart, P.; "Mechanisms of Liquid-Metal-Activated Aluminum-Water Reactions and The Application"; Massachusetts Institute of Technology Sep. 2021; Dept. of Mechanical Engineering: Aug. 6, 2021; 351 pages.

Meroueh, L., "Effects of Doping and Microstructural Variables on Hydrogen Generated Via Aluminum-Water Reactions Enabled by a Liquid Metal," Massachusetts Institute of Technology (MIT), Department of Mechanical Engineering, Sep. 2020 (127 pages).

Chao, et al., "Maximized On-Demand Hydrogen Generator Design," Adv. Mt. Res. V690-693, pp. 954-961 (2013).

U.S. Patent and Trademark Office, "Notice of Allowance," issued in related U.S. Appl. No. 17/177,144 dated Jun. 9, 2021 (6 pages).

U.S. Patent and Trademark Office, "Non-Final Office Action," issued in related U.S. Appl. No. 17/487,280 dated Dec. 19, 2022 (50 pages).

U.S. Patent and Trademark Office, "Final Office Action," issued in related U.S. Appl. No. 17/487,280 dated Sep. 1, 2023 (34 pages).

U.S. Patent and Trademark Office, "Notice of Allowance," issued in related U.S. Appl. No. NOA in U.S. Appl. No. 18/347,274 dated Mar. 27, 2024 (9 pages).

* cited by examiner

STORING ACTIVATED ALUMINUM

CROSS-REFERENCE TO RELATED APPLICATIONS

This application is a continuation of U.S. patent application Ser. No. 17/115,437, filed on Dec. 8, 2020, which claims the benefit of priority to U.S. Provisional Patent Application No. 62/945,201, filed on Dec. 8, 2019, with the entire contents of each of these applications incorporated herein by reference.

BACKGROUND

Under normal environmental conditions, aluminum is covered with a protective oxide coating. This oxide coating forms rapidly in air and is stable. Thus, although aluminum is reactive with water to produce hydrogen and heat, the oxide coating on aluminum is an obstacle to using aluminum as a source of energy.

To overcome the impact of aluminum oxide on the water-reactivity of aluminum, aluminum can be treated to be in an activated form that yields a large amount of hydrogen and heat when reacted with water. With this combination of energy density and water-reactivity, activated aluminum is a volumetrically efficient and easily useable source of hydrogen. However, because it is subject to fouling by oxygen, water vapor, or other contaminants, activated aluminum can have a limited and unpredictable shelf-life.

SUMMARY

According to one aspect, a system for hydrogen formation may include a container defining a reservoir, the container flexible along the reservoir, the container forming a gas-tight seal between the reservoir and an atmosphere outside of the container, and at least one object including aluminum in an activated form, the at least one object disposed in an inert environment in the reservoir, and the activated form of the aluminum reactable to produce hydrogen in the reservoir upon exposure to water.

In certain implementations, the at least one object may have a first volume, the reservoir has a second volume greater than the first volume, and the difference between the second volume and the first volume may be less than about 50 percent such that the container conforms to the at least one object along the reservoir.

In some implementations, the inert environment in the reservoir is a vacuum.

In certain implementations, with the at least one object disposed in the reservoir, the container may be foldable onto itself along the reservoir. In some instances, the reservoir may be expandable to unfold the container under pressure of hydrogen producible in the reservoir upon exposure of the at least one object to water.

In some implementations, the system may further include a first conduit defining a first port, wherein the first conduit has a first longitudinal dimension extending along the reservoir, the first port is in fluid communication with the reservoir via the first conduit, and the first port is accessible from outside of the container. The at least one object may be arranged, for example, in a plurality of rows in the reservoir, the plurality of rows substantially parallel to one another and to the first longitudinal dimension of the first conduit extending along the reservoir. Additionally, or alternatively, the first conduit may define a plurality of openings collectively extending along the first longitudinal dimension of the first conduit, and the plurality of openings sized to deliver, at a given pressure of water within the first conduit, a variable amount of water into the reservoir in a direction extending away from the first port. In some cases, each opening of the plurality of openings may be a slit openable in response to water pressure in the first conduit.

In certain implementations, the system may further include a second conduit defining a second port, wherein the second conduit has a second longitudinal dimension extending along the reservoir, the second port is in fluid communication with the reservoir via a plurality of orifices along the second longitudinal dimension and is accessible from outside of the container. The first longitudinal dimension of the first conduit and the second longitudinal dimension of the second conduit may be substantially parallel to one another in the reservoir. Additionally, or alternatively, the container may be foldable along the first longitudinal dimension of the first conduit and the second longitudinal dimension of the second conduit. Further, or instead, the first port and the second port may be adjacent to one another. Still further or instead, at least one of the first port or the second port may be resealable.

In some implementations, the container may include a bellows flexible along the reservoir.

In certain implementations, at least along the reservoir, the container may include a polymer having a glass transition temperature greater than boiling water (e.g., greater than about 120° C.).

In some implementations, the container may include at least one sheet and at least a portion of the reservoir is defined by a weld along the at least one sheet.

According to another aspect, a system for hydrogen generation may include a container defining a reservoir, the container flexible along the reservoir, water-reactive aluminum in the reservoir, a first hose porous and extending in the reservoir, and a second hose porous and extending in the reservoir, wherein the first hose and the second hose are each flexible with the container along the reservoir.

In certain implementations, the container may include a sheet and a weld about at least a portion of a perimeter of the container.

In some implementations, the water-reactive aluminum is between the first hose and the second hose in the reservoir.

In certain implementations, the container is foldable upon itself with the first hose, the second hose, and the material disposed in the reservoir.

BRIEF DESCRIPTION OF THE FIGURES

Like reference symbols in the various drawings indicate like elements.

DETAILED DESCRIPTION

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

Using aluminum as a source of hydrogen and heat can present challenges in field applications in which logistics are a challenge and yet it is necessary to generate a significant amount of hydrogen and/or heat reliably under unpredictable conditions. Further, given that many field applications are constrained by the amount of equipment that can be transported efficiently, containing the hydrogen and/or heat produced from the reaction of water and an activated form of aluminum can also be a practical limit to the usefulness of aluminum as an energy. Accordingly, in the description that follows, various aspects of containing activated aluminum and its reaction products with water are described. For example, the systems described herein facilitate long-term storage of an activated form of aluminum in a container that is compact for portability and while being expandable to contain hydrogen and/or heat, even under uncontrolled field conditions.

As used herein, the terms "activated aluminum," "aluminum in an activated form," and "water-reactive aluminum" shall be understood to be interchangeable with one another, unless otherwise specified or made clear from the context, with the different terms being used as appropriate to facilitate readability in different contexts. Further, unless a contrary intent is indicated, each of these terms shall be understood to include any manner and form of aluminum that may produce hydrogen upon exposure to water, with or without the addition of additional materials. Some examples of activated aluminum useable herein are set forth in U.S. Pat. No. 10,745,789, issued Jonathan Thurston Slocum on Aug. 18, 2020, and entitled "Activated Aluminum Fuel," the entire contents of which are hereby incorporated herein.

Referring now to FIGS. 1A-1G, a system 100 for hydrogen formation may include a container 102 (e.g., a bag-like structure) and at least one instance of an object 104, with the object 104 including an activated form of aluminum reactable to produce hydrogen upon exposure to water. The object 104 may be disposed in a reservoir 106 defined by the container 102 such that the container 102 may generally preserve the physical and chemical integrity of the object 104 such that the activated aluminum of the object 104 may reliably produce hydrogen and heat, even after a long period of storage and/or after being transported to the field under uncontrolled conditions. For example, the container 102 may form a gas-tight seal between the reservoir 106 and an atmosphere outside of the container 102, thus reducing the likelihood of inadvertently exposing the activated aluminum of the object 104 to moisture or other environmental contaminants that can degrade the reactability of the activated form of aluminum. As described in greater detail below, the reservoir 106 in which the object 104 is contained may be an inert environment, as may be useful for reducing the likelihood that the object 104 does not degrade in situ within the reservoir 106 during long periods of storage. As also described in greater detail below, the container 102 may be flexible at least along the reservoir 106 such that the system 100 is compact when it is serving as a long-term storage vessel for the object 104 use but is also a reaction chamber expandable to retain a significant fraction of the hydrogen produced when water is introduced into the reservoir 106 at a point of use of the system 100. Thus, among other things, it shall be appreciated that the system 100 may robustly produce hydrogen from aluminum and hydrogen, even under field conditions in which environmental conditions and the demand for hydrogen are unpredictable, resources are constrained, and portability is critical.

Figure 1A:
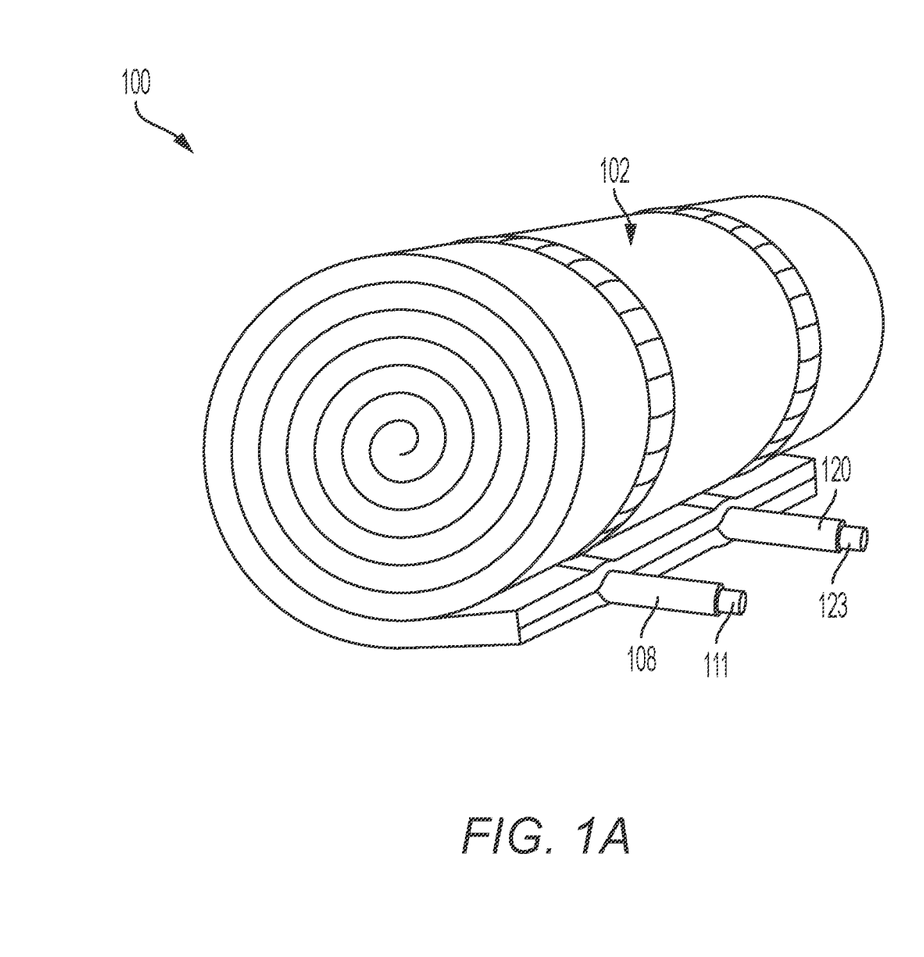
FIG. 1A is a perspective view of a system for hydrogen formation, with a container of the system shown in an initial position prior to the introduction of water into the container to react therein with aluminum in an activated form.
Figure 1B:
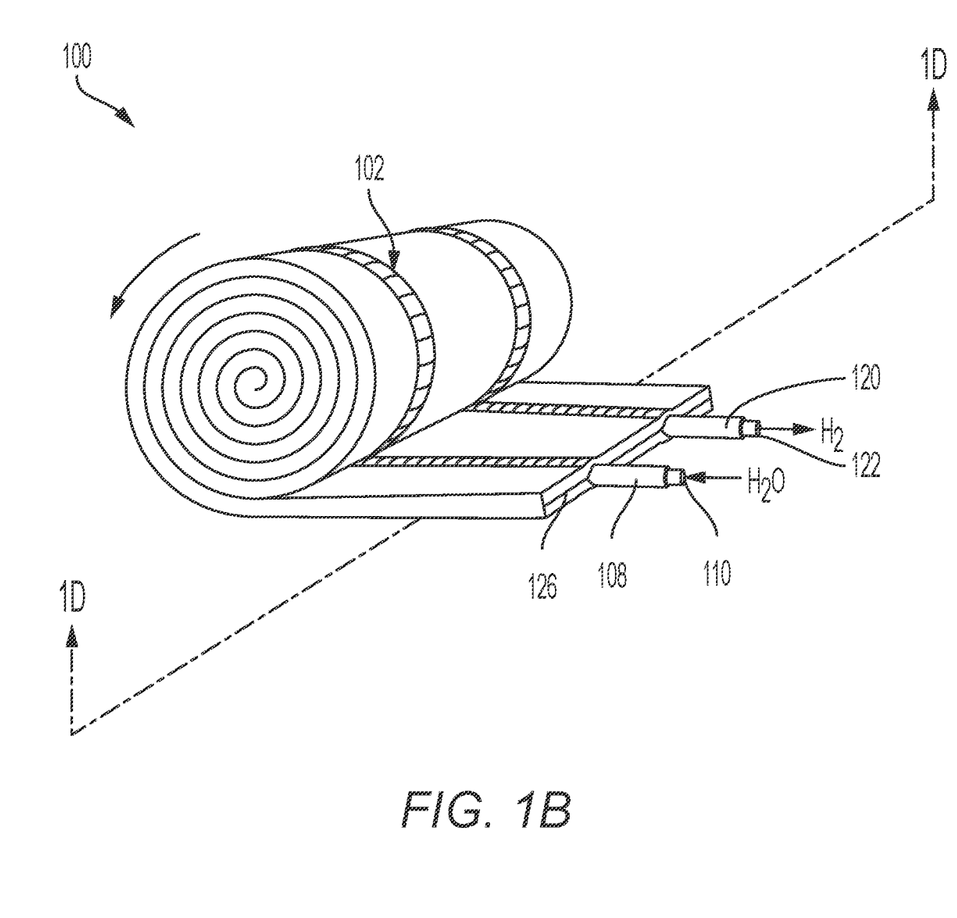
FIG. 1B is a perspective view of the system of FIG. 1A, shown at a first time shortly after water has been introduced into the container to react therein with aluminum in the activated form.
Figure 1C:
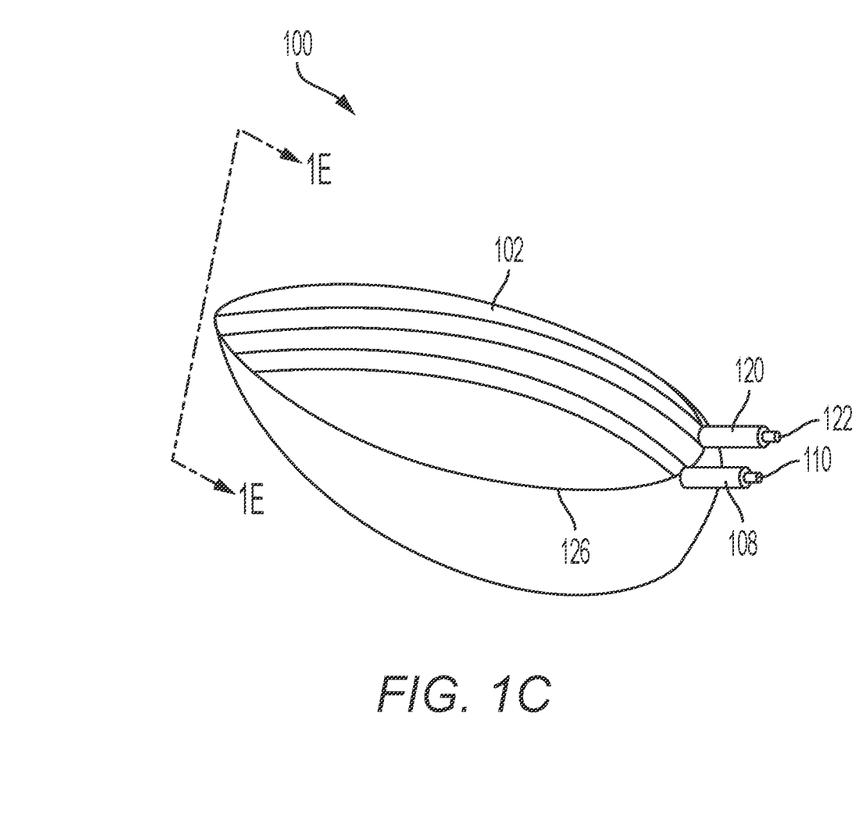
FIG. 1C is a perspective view of the system of FIG. 1A, with the system shown at a second time at which water has reacted with substantially all of the aluminum in the container.
Figure 1D:
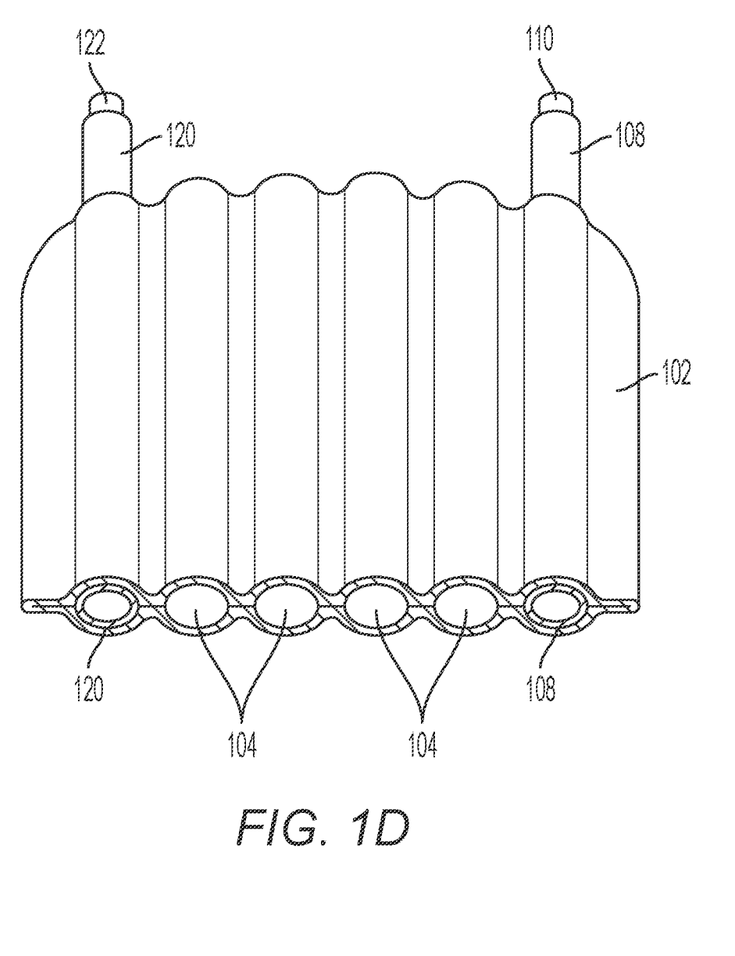
FIG. 1D is a perspective view of the cross-section of the system taken along the line 1D-1D in FIG. 1B.
Figure 1E:
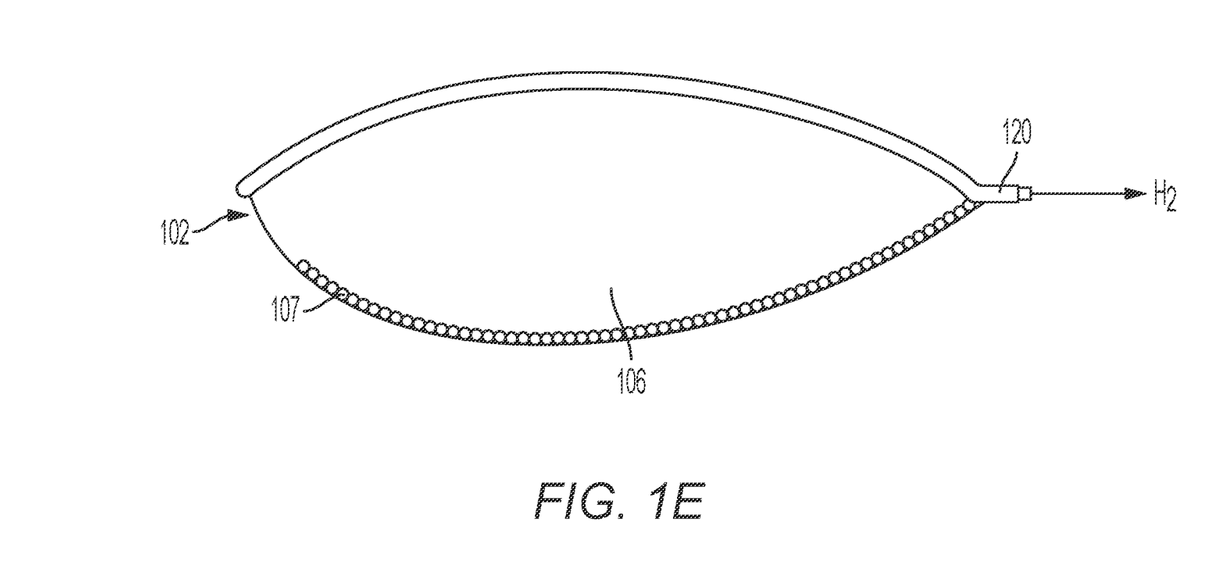
FIG. 1E is a side view of the cross-section of the system taken along the line 1E-1E in FIG. 1C.
Figure 1F:
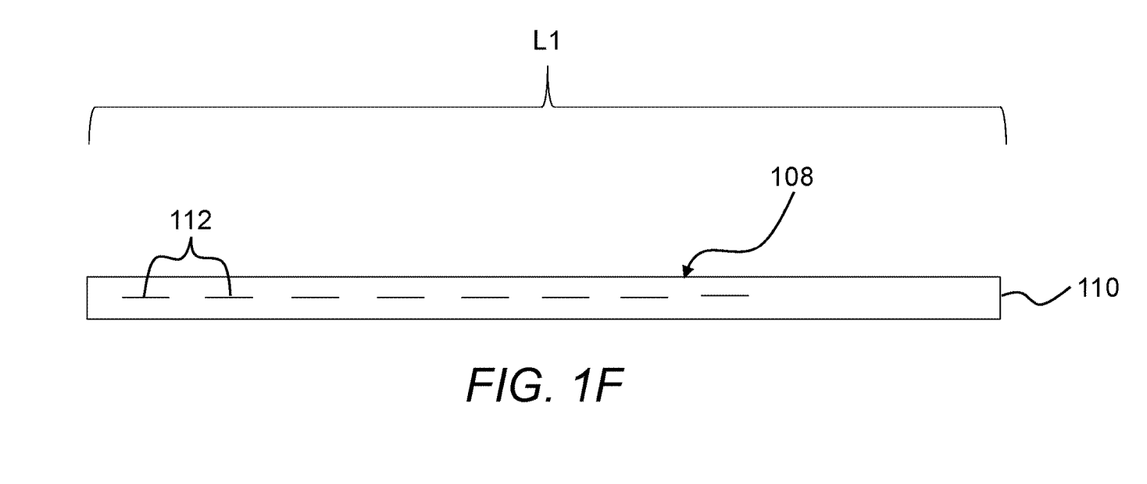
FIG. 1F is a side view of a first conduit of the system of FIG. 1A.
Figure 1G:
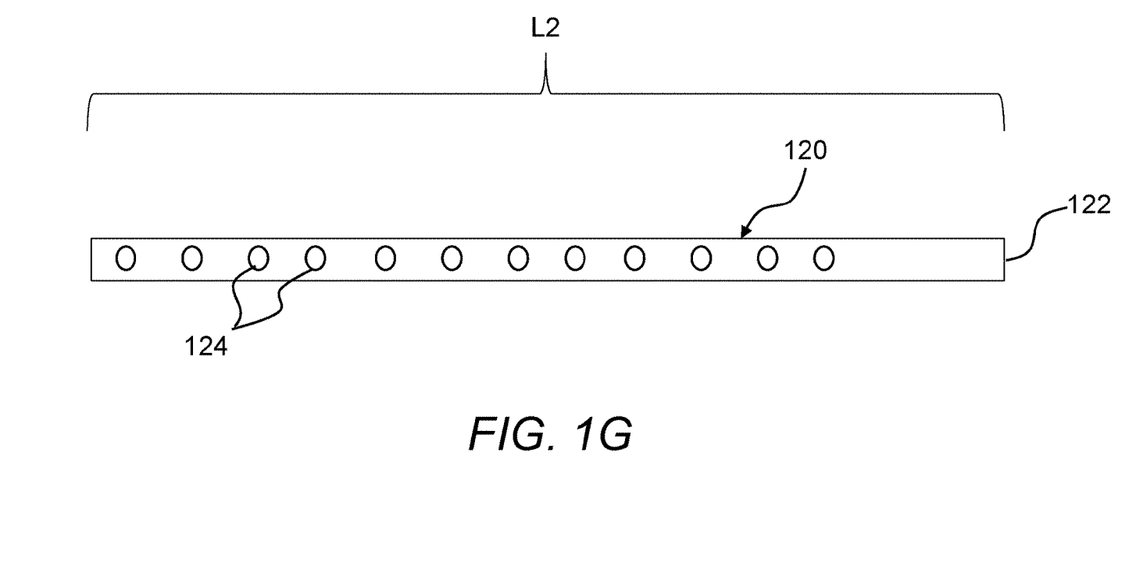
FIG. 1G is a side view of a second conduit of the system of FIG. 1A.

In general, with object 104 unreacted therein (e.g., FIG. 1A), the container 102 may have any one or more of various different form factors useful for conserving space, as compared to the size of the container 102 when substantially all of the activated aluminum in the object 104 has reacted with water to produce hydrogen (e.g., FIG. 1C). While the overall dimensions of the container 102 may depend on a particular end-use case, it shall be appreciated that achieving a compact form factor of the system 100 before it is used is generally useful across a variety of applications, given that such compactness eases the requirements associated with transport and/or storage. Further, it shall be appreciated that certain features of the container 102 may facilitate achieving such compactness regardless of the overall dimensions of the container 102.

As an example, with the object 104 disposed in the reservoir 106, the container 102 may be foldable onto itself at least along the reservoir 106. As used in this context, the term "foldable" shall be understood to include any manner and form of bending the container 102 at least along the reservoir 106 such that one portion of the container 102 covers another portion of the container 102. Thus, the term "foldable" includes the container 102 rolled onto itself as shown in the figures. In certain implementations, the container 102 may be folded onto itself along the reservoir 106 in a pattern (e.g., a predetermined pattern) complimentary to the flexibility of the container 102 such that the reservoir 106 of the container 102 is expandable to unfold the container 102 under pressure of hydrogen producible in the reservoir 106 upon exposure of the at least one object to water. The use of pressure within the reservoir 106 to unfold the container 102 may reduce the amount of time required to produce hydrogen using the system 100 and, further or instead, may facilitate single-user operation of the system 100.

To additionally, or alternatively, realize a compact form factor of the system 100, the container 102 may conform to the object 104 disposed in the reservoir 106. For example, the object 104 may have a first volume, the reservoir 106 may have a second volume greater than the first volume, and the difference between the first volume and the second volume may be small to reduce wasted space before the system 100 is used. As a more specific example, the difference between the second volume of the reservoir 106 and the first volume of the object 104 may be less than about 50 percent.

To be robust as both a compact vessel in storage and a reaction chamber in use in the field, the container 102 may be advantageously include a flexible and heat-resistant polymer (e.g., polypropylene, high-temperature plastic, flexible composite, or rubber) alone or as part of a composite material. With respect to flexibility, the polymer may support repeated cycles of folding and unfolding of the container 102. Additionally, or alternatively, if the polymer includes rubber the container 102 may expand. Additionally, or alternatively, with respect to heat-resistance, the polymer may maintain structural integrity as water is reacted with the activated aluminum of the object 104 in the reservoir 106 to produce hydrogen and steam. For example, at least along the reservoir 106, the container may include a polymer having a glass transition temperature greater than boiling water (e.g., greater than about 120° C.).

In general, the inert environment of the reservoir 106 may be any one or more of various different types of environments in which the activated aluminum of the object 104 is more stable than it is in atmospheric air at standard temperature (70° C.) and pressure (1 atm). Since only water is let into the once-inert environment of the reservoir 106, only the object 104, water, and reaction byproduct 107 are present in the reservoir 106 as the water reacts with the activated aluminum of the object 104, thus reducing the likelihood of mixing hydrogen with unwanted gases (e.g., air). That is, the inert environment in the reservoir 106 may facilitate maintaining hydrogen purity necessary, or at least desirable, for certain end-uses (e.g., as a fuel for a fuel cell, an internal combustion engine, or another container for subsequent use in a purity-sensitive application).

In certain instances, the inert environment in the reservoir 106 may be a vacuum, which shall be understood to include an environment at least partially exhausted of gas (e.g., air). Such a vacuum may be achieved, for example, by vacuum sealing the reservoir 106. In addition to reducing the likelihood of contamination of the activated aluminum of the object 104 in the reservoir 106, such a vacuum may advantageously draw the flexible portion of the container 102 along the reservoir 106 toward the object 104 in the container 102 to reduce the overall size of the container 102.

Additionally, or alternatively, the inert environment in the reservoir may include one or more inert gases. Examples of such inert gases include nitrogen, argon, or a combination thereof. While such gases may be advantageously purified, it shall be appreciated that benefits of the inert gas may be achieved even with some contaminants present. For example, in some instances, the inert gas may include oxygen-depleted air having an oxygen having a small amount of oxygen (e.g., less than about 10 percent and greater than about 0 percent by volume).

In certain implementations, the system 100 may include a first conduit 108 defining a first port 110. The first conduit 108 may have a first longitudinal dimension L1 extending along the reservoir 106, and the first port 110 may be in fluid communication with the reservoir 106 via the first conduit 108. For example, the first port 110 may be accessible from outside the container 102 to facilitate introducing water into the container 102 to drive the reaction with activated aluminum to form hydrogen and steam. More specifically, water may be introduced into the first port 110 such that the water flows into the reservoir 106 and, in particular, into contact with the activated aluminum of the object 104 disposed in the reservoir 106.

In some cases, the first conduit 108 may include a first cap 111 disposed over the first port 110 to form a seal (e.g., a gas-tight seal) with the first port 110 when the system 100 is not in use, such as while the system 100 is stored. In some instances, the first cap 111 may be repeatedly positionable over the first port 110 such that the first cap 111 may reseal the first port 110 in the event that it is necessary or desirable to form hydrogen from the activated aluminum of the object 104 intermittently. For example, in some cases the first cap 111 may be a valve actuatable between an open and closed position to facilitate controlling (e.g., manually controlling) the introduction of water into the reservoir 106. In instances in which the first cap 111 is a valve, it shall be appreciated that the valve may reduce the likelihood of backflow of the contents of the reservoir 106 back through the first port 110.

Because the object 104 is already present in the reservoir 106 at the inception of use of the system 100, the completeness and rate of reaction of the activated aluminum of the object 104 to form hydrogen may be dominated by the physical aspects of introducing water to the object 104. Stated differently, the arrangement of the first conduit 108 and the object 104 relative to one another in the reservoir 106 may be useful, if not critical, for achieving a reaction that proceeds to completion within a useful amount of time for a given application. Further, or instead, the physical orientation of the first conduit 108 relative to the object 104 may facilitate driving the reaction at an appropriate rate with little or no special skill or training required by the user. That is, the first conduit 108 may facilitate self-regulating distribution of water along the object 104 within the reservoir 106.

By way of example and not limitation, the first conduit 108 may be a porous hose extending along the reservoir 106 to deliver water in a controlled manner to the activated aluminum of the object 104. For example, the object 104 may be arranged in at least one row (e.g., in a plurality of rows parallel to one another and, in some cases, evenly spaced from one another in the reservoir 106) in the reservoir 106, and the first longitudinal dimension L1 of the first conduit 108 may be parallel to the row formed by the object 104. Continuing with this example, the first conduit 108 may define a plurality of openings 112 along the first longitudinal dimension L1 of the first conduit 108. The plurality of openings 112 may be sized to deliver, at a given pressure of water within the first conduit 108, a variable amount of water into the reservoir in a direction extending away from the first port 110. Some examples of such controlled introduction of water into the reservoir 106 will now be described.

For example, each instance of the plurality of openings 112 may be a slit openable in response to water pressure in the first conduit 108. As the water is pressurized in the first conduit 108, an instance of the plurality of openings 112 closest to the first port 110 will open to release water and reduce the pressure to subsequent slits along the first longitudinal dimension L1 of the first conduit 108, and the subsequent instances of the plurality of openings 112 will not open. As the activated aluminum of the instances of the object 104 reacts with the water that was initially introduced, water flow in the first conduit 108 will ebb and the next instances of the plurality of openings 112 will open, and so on along the first longitudinal dimension L1 of the first conduit 108 in a direction extending away from the first port 110. As a result of such introduction of water into the reservoir 106, the reaction of activated aluminum to produce hydrogen may occur in a wave and, to the extent the container 102 is folded when the reaction begins, the container 102 unfold as the reaction progresses. Once the container 102 is entirely unfolded, water may wick to the reaction byproduct 107 and any activated aluminum that remains unreacted may create a moisture concentration gradient that will attract further water to react with the activated aluminum of the object 104.

While the plurality of openings 112 may be advantageously formed as slits in some instances, it shall be appreciated that other shapes and sizes may be additionally or alternatively used to control the distribution of water in the reservoir 106. For example, the plurality of openings 112 may be holes such that the flow of water through the plurality of openings 112 will be greatest near the portion of the first conduit 108 closest to the first port 110 and will decrease along the longitudinal dimension L1 of the first conduit 108. As the reactions develops, the instances of the plurality of openings 112 with the greater amounts of flow will be choked off and instances of the plurality of openings 112 further away from the first port 110 will have more flow and, again, a wave-like reaction analogous to the one discussed above may occur in the reservoir 106.

Having described aspects of the introduction of water into the reservoir 106 to react with activated aluminum of the object 104 to produce hydrogen gas, attention is now directed to the collection of hydrogen gas that has been produced. In general, unless otherwise specified or made clear from the context, the hydrogen collected from the reservoir 106 may be used for any one or more of various different types of applications for which hydrogen may be useful, such as an input to a fuel cell to produce electricity or as a lifting gas for a structure such as a balloon. Independent of the end-use of the hydrogen, however, it is typically beneficial to collect as much of the hydrogen as possible, given that this results in the safest and most efficient use of the activated aluminum carried in the container 102 to the use site.

In certain implementations, the system 100 may include a second conduit 120 defining a second port 122. The second conduit 120 may have a second longitudinal dimension L2 extending along the reservoir 106. The second conduit 120 may be, for example, a porous hose. That is, the second port 122, may be in fluid communication with the reservoir via a plurality of orifices 124 along the second longitudinal dimension L2. Additionally, or alternatively, the second port 122 may be accessible from outside of the container 102, as may be useful for connecting the system 100 to another component associated with an end-use application (e.g., to couple the system 100 to a balloon or another inflatable structure) such that hydrogen may flow from the second port 122 directly to the end-use application with little or no interaction with oxygen or other contaminants in the environment.

The second conduit 120 may, for example, include a second cap 123 disposed over the second port 122 to form a seal (e.g., a gas-tight seal) with the second port 122 when the system 100 is not in use (e.g., during storage). In some instances, the second cap 123 may be repeatedly positionable over the second port 122 such that the second cap 123 may reseal the second port 122 in the event that it is necessary or desirable to form hydrogen from the activated aluminum of the object 104 intermittently. Further, or instead, resealing the second port 122 using the second cap 123 may facilitate using the container 102 to store hydrogen, at least temporarily, in the field. As an example, the second cap 123 may be a valve actuatable between an open and closed position to selectively dispensing (e.g., manually and/or automatically controlling) to multiple end applications with little or no waste of hydrogen. Further, or instead, in instances in which the second cap 123 is a valve, it shall be appreciated that the valve may reduce the likelihood of backflow of air or other environmental contaminants into the reservoir 106 through the second port 122. Returning again to the example in which the first conduit 108 includes a first cap 111, it shall be appreciated that the first cap 111 may be positioned to block the first port 110 while the second cap 123 is operated to permit the flow of hydrogen out of the reservoir 106 via the second port 122. More generally, coordinated operation of the first cap 111 and the second cap 123 may, for example, reduce the likelihood of contamination of the contents of the reservoir 106 while or after hydrogen is being produced in the reservoir 106.

In general, the container 102 may be foldable upon itself with the first conduit 108, the second conduit 120, and the object 104 disposed in the reservoir 106, as is useful for forming the system 100 into a compact form factor amenable to portability and efficient storage. As an example, the first longitudinal dimension L1 of the first conduit 108 and the second longitudinal dimension L2 of the second conduit 120 may be substantially parallel to one another (e.g., to within ±10 degrees) in the reservoir. In such implementations, the container 102 may be foldable along the first longitudinal dimension L1 of the first conduit 108 and the second longitudinal dimension L2 of the second conduit 120.

In certain implementations, the object 104 may be disposed between the first conduit 108 and the second conduit 120 in the reservoir 106. Such relative spacing may be useful for reducing the likelihood of backflow through an unintended port. Further, or instead, the object 104 positioned between the first conduit 108 and the second conduit 120 may facilitate unfolding the container 102 in a controlled and predetermined manner.

In general, the first port 110 and the second port 122 may be spaced relative to one another in any one or more of various different orientations as may be useful for facilitating water into the reservoir 106 and collecting hydrogen from the reservoir 106. Thus, for example, the first port 110 and the second port 122 may be adjacent to one another, as may be useful for single-operator use of the system 100. That is, with the first port 110 and the second port 122 adjacent to one another, a single operator may be able to reach both ports and, thus, may be able to control the flows through the first port 110 and the second port 122 in coordination with one another. Further, or instead, positioning the first port 110 and the second port 122 adjacent to one another may be particularly useful for using the system 100 without the need to unfold the container 102 first. That is, with the first port 110 and the second port 122 adjacent to one another, each port is accessible even without unfolding the container 102. In addition to saving time, this may serve as a further benefit for single-operator use.

While it may be useful to have the first port 110 and the second port 122 positioned adjacent to one another, it shall be appreciated that the first port 110 and the second port 122 may be positioned opposite one another such that water is introduced along one side of the container 102 and hydrogen is collected on an opposite side of the container 102. In this manner, the second conduit 120 is unlikely to become clogged by the reaction byproduct 107, which expands. Further, or instead, this arrangement may reduce the likelihood that the first conduit 108 may be stopped by the reaction byproduct 107. In certain implementations, one or both of the first conduit 108 or the second conduit 120 may protrude from both ends of the container 102, as may be useful for operating the system 100 in different orientations.

In general, the container 102 may be formed according to any one or more of various different techniques capable of withstanding the temperatures and pressures associated with the reaction of activated aluminum of the object 104 in the reservoir 106. For example, the container 102 may include one or more sheets that are welded (e.g., heat welded) to form the reservoir 106. Further, in instances in which the system 100 includes one or more of the first conduit 108 or the second conduit 120, a weld 126 about the first port 110 and/or the second port 122 may secure the respective port and, thus, the respective conduit in place.

While the system 100 has been described as producing steam along with hydrogen, it shall be appreciated that certain applications may not require the use of steam. In such instances, the container 102 may dissipate heat for the chemical reaction (e.g., by being uninsulated, by including thermally conductive material, and/or by being submersible in water). To the extent such heat-dissipation condenses the steam, it shall be appreciated that the resulting water may react with the activated aluminum in the reservoir 106, thus facilitating the production of the same amount of hydrogen using less water, under otherwise identical conditions.

While the container 102 has been described with respect to aspects related to storage and hydrogen formation, it shall be appreciated that the container 102 may be additionally, or alternatively, useful for retaining and properly disposing of the reaction byproduct 107. For example, the container 102 may be disposable with the reaction byproduct 107 therein. Additionally, or alternatively, the reservoir 106 may be accessible from outside of the container 102 to remove the reaction byproduct 107 and replace the object 104 such that the system 100 may be reused.

While the container 102 has been described as being formed of an elastic material along the container 102, it shall be appreciated that flexibility may additionally or alternatively be imparted to a container according to other techniques. For example, referring now to FIG. 2A and FIG. 2B, a container 202 may include a bellows 230, and being a bellows, it is flexible and can also expand in volume. Unless otherwise specified, or made clear from the context, the container 202 shall be understood to be analogous to the container 102 and, therefore, is not described separately, except to note difference or to emphasize certain aspects. Thus, generally, it shall be understood that the container 202 may be used to react activated aluminum with water to form hydrogen gas according to any one or more of the various different techniques described herein.

Figure 2A:
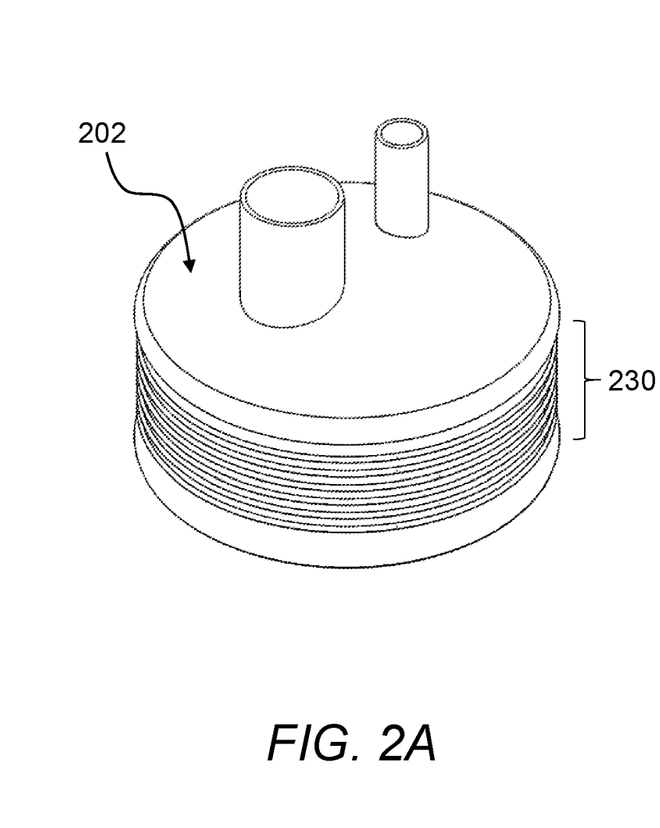
FIG. 2A is a perspective view of a container including a bellows, the container shown with the bellows in a compressed state.
Figure 2B:
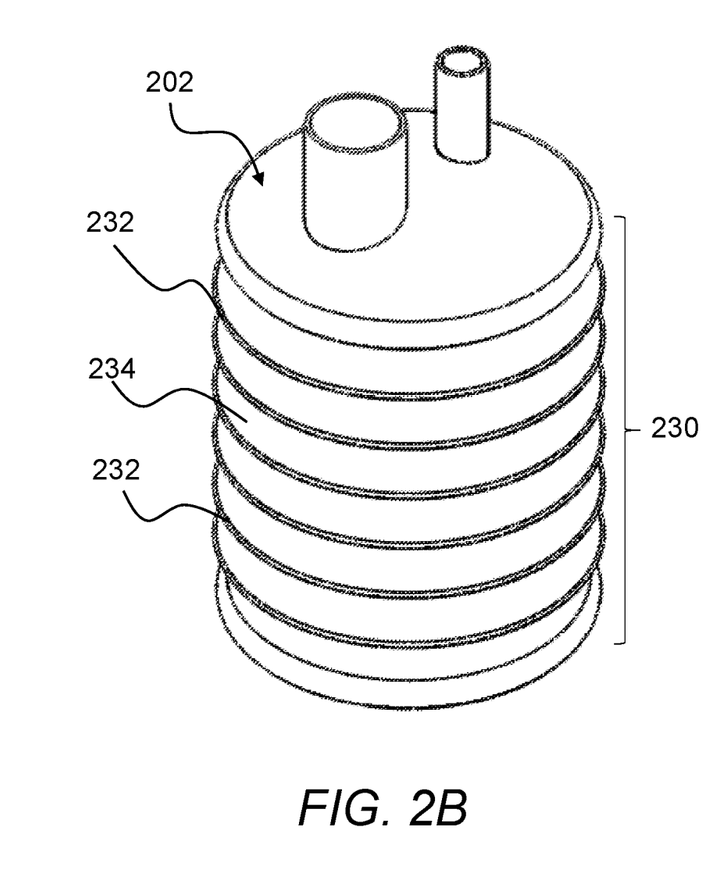
FIG. 2B is a perspective view of the container of FIG. 2A, the container shown with the bellows in an expanded state.

The bellows 230 may be flexible to change the size and shape of the container 202. For example, bellows 230 may include rigid sections 232 joined together by a flexible membrane 234. The rigid sections may be formed, for example, of one or more rigid and temperature-resistant metals (e.g., stainless steel). Additionally, or alternatively, the flexible membrane 234 may be formed of a polymer (e.g., any one or more of the various different polymers described herein) having a glass transition temperature greater a boiling temperature of water (e.g., greater than about 120° C.). The bellows 230 may be useful, for example, for withstanding high temperatures and pressure within the reservoir 206. Further, or instead, the bellows 230 facilitate reusing the container 202.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. An apparatus for hydrogen formation, the apparatus comprising:
   a container defining a reservoir, the container expandable along the reservoir; an activated form of aluminum disposed in the reservoir and reactive to produce hydrogen in the reservoir upon exposure to water;
   at least one conduit fluid permeable into the reservoir; and
   a valve in fluid communication with the reservoir, the valve actuatable between an open position and a closed position to selectively dispense hydrogen from the reservoir, wherein the at least one conduit is elongate with an elongate dimension along the reservoir, and the container is foldable onto itself across the elongate dimension of the at least one conduit along the reservoir.

2. The apparatus of claim 1, wherein the valve, in the closed position, forms a gas-tight seal.

3. The apparatus of claim 1, wherein the container is foldable onto itself along the reservoir.

4. The apparatus of claim 1, wherein the at least one conduit is fluid permeable via a plurality of orifices defined by the at least one conduit.

5. The apparatus of claim 1, wherein the at least one conduit is fluid permeable via a plurality of slits defined by the at least one conduit, each slit in the plurality of slits openable in response to fluid pressure above a threshold in the at least one conduit.

6. The apparatus of claim 1, wherein, at least along the reservoir, the container is elastically deformable.

7. The apparatus of claim 6, wherein, at least along the reservoir, the container includes a polymer having a glass transition temperature greater than about 120° C.

8. The apparatus of claim 1, wherein the container includes at least one sheet and at least a portion of the reservoir is defined by a weld along the at least one sheet.

9. The apparatus of claim 8, wherein the weld restricts movement of the at least one conduit.

10. The apparatus of claim 1, wherein the at least one conduit is elongate, and the at least one conduit is fluid permeable in an axial direction of the at least one conduit.

11. The apparatus of claim 10, wherein the elongate dimension of the at least one conduit spans a dimension of the reservoir.

12. The apparatus of claim 10, wherein the at least one conduit includes a plurality of conduits, and the activated form of aluminum is between the plurality of conduits prior to reaction of the activated form of aluminum.

13. The apparatus of claim 10, wherein the at least one conduit includes a plurality of conduits substantially parallel to one another along the reservoir.

* * * * *